(12) United States Patent
Wetzel et al.

(10) Patent No.: US 7,130,538 B2
(45) Date of Patent: Oct. 31, 2006

(54) OPTICAL SWITCH AND NETWORKING METHOD

(75) Inventors: Glen Franklin Wetzel, San Jose, CA (US); Lyle A. Weiman, Cupertino, CA (US)

(73) Assignee: Avago Technologies Fiber IP (Singapore) Ptd. Ltd., Singapore (SG)

( * ) Notice: Subject to any disclaimer, the term of this patent is extended or adjusted under 35 U.S.C. 154(b) by 483 days.

(21) Appl. No.: 09/805,407

(22) Filed: Mar. 12, 2001

(65) Prior Publication Data

US 2002/0126342 A1 Sep. 12, 2002

(51) Int. Cl.
*H04J 14/00* (2006.01)
(52) U.S. Cl. .............................. 398/45; 398/43; 398/59
(58) Field of Classification Search ................ 398/43, 398/58, 59; 370/254–258
See application file for complete search history.

(56) References Cited

U.S. PATENT DOCUMENTS

| 5,684,959 | A |   | 11/1997 | Bhat et al. ................... 709/224 |
| 6,005,694 | A | * | 12/1999 | Liu .............................. 398/6 |
| 6,414,767 | B1 | * | 7/2002 | Blair et al. .................... 398/59 |
| 6,532,088 | B1 | * | 3/2003 | Dantu et al. ................... 398/43 |
| 6,614,754 | B1 | * | 9/2003 | Usuba et al. ................ 370/222 |

* cited by examiner

*Primary Examiner*—David C. Payne

(57) ABSTRACT

An optical node capable of automatically detecting its interconnectivity is disclosed. The node includes a light switch, a light source, light detector, a control circuit having a unique identification. The node sends its identification via each of its ports and also listens to each of its ports for identification from other nodes. The node may store the interconnectivity information, forward the interconnectivity information to another node, or forward the interconnectivity information to a path router.

8 Claims, 2 Drawing Sheets

OPTICAL SWITCH AND NETWORKING METHOD

BACKGROUND

The present invention relates to the art of data networks. More particularly, the present invention relates to data networks using optical switches.

Because of ever increasing bandwidth requirements, data networks utilizing optical transmission systems are becoming popular. Optical transmission systems have a larger bandwidth compared to electrical transmission systems.

FIG. 1 illustrates a simplified optical switching network 100 including a plurality of input lines represented by lines 102a, 102b, and ellipsis 102c (collectively, "102") and a plurality of output lines represented by lines 104a, 104b, and ellipsis 104c (collectively, "104"). In the network 100, three optical nodes NA 110, NB 120, and NC 130 are illustrated. Although only three nodes are shown, the switching network 100 may include hundreds or even thousands of interconnected optical nodes.

Node NA 110 has an optical switch 112, a control circuit 114, and a plurality of input lines and output lines, or ports, designated, for convenience, NA0 to NAn where n is an integer. Typical values for n may be 15, 63, or 255. The ports—NA0, NA1, . . . and NAn—are ports of the node NA 110 as well as the ports of the switch 112. The switch 112 may utilize micro mirrors, liquid, or gaseous elements (generically, "switching element") to direct or reflect optical signals from a first port to a second port. Typically, the ports are bi-directional but is sometimes uni-directional. The control circuit 114, connected to the switch 112, controls the state of the switching elements to implement Node NA 110 as described herein above is known in the art.

Nodes NB 120 and NC 130 are similarly configured to node NA 110, and their ports are similarly denoted herein. A path router 140 is connected to nodes NA 110, NB 120, and NC 130. The path router 140 contains physical path topology of the network 100 necessary to make connections as requested. The path router 140 contains the physical network topology of how the switches are connected.

For instance, in order for the path router 140 to successfully direct an input signal at input line 102b to an output line 104b, the path router 140 needs to know that (1) the input line 102b feeds into port NA1; (2) port NA9 is connected to port NB1; (3 port) NB8 is connected to port NC7; and (4) port NC9 is connected to the output line 104b. With the information, the path router 140 signals node NA 110 to route its port NA1 to its port NA9, signals node NB 120 to link its port NB1 to its port NB8, and signals node NC 130 to link its port NC7 to its port NC9. The physical path topology information may be entered directly into the path router 140 or supplied by an external controller system (not shown), connected to the path router 140.

In the illustrated configuration, port NA9 is connected to port NB1 (connection 150) and port NB8 is connected to port NC7 (connection 152). The other ports of nodes NA 110, NB 120, and NC 130 may be connected to ports of nodes not show in FIG. 1. As the number of nodes, thus the ports, grows in the network 100, the number of possible connections grows exponentially. It is not uncommon to have a network with hundreds or even thousands of ports. Prior art requires that the physical topology be configured manually.

Without a correct topology of the network 100 as defined by the connection information of the routing table, the network 100 does not operate effectively.

The processes of manually defining the full network physical path topology for the path router 140 are susceptible to error. For example, an optical path can be made to an unintended node. Or, incorrect data may be entered into the path router 140. The problem is exacerbated by the fact that networks are becoming increasingly large and complex.

Moreover, when new nodes are installed, connections are modified, or when error in connection information is suspected, the entire network must be manually analyzed, and the topology manually reconfigured. No dynamic or automated procedure exists to determine the network topology.

Accordingly, there remains a need for an improved technique to determine the connections and topology of an optical network.

SUMMARY

These needs are met by the present invention. According to one aspect of the present invention, an apparatus has an optical switch for routing optical signals, the optical switch including ports. The apparatus also includes a light source, a light detector, and a control circuit connected to the optical.

According to a second aspect of the invention, an optical network including a plurality of optical nodes is disclosed. A node includes an optical switch for routing optical signals, the optical switch including ports. Further, the node has a light source, a light detector, and control circuit connected to the optical switch.

According to a third aspect of the invention, a method of determining topology of a network is disclosed. First, connection information of a first port of a first node is determined. Then, a path router is updated with the connection information.

According to a fourth aspect of the invention, a method of discovering an optical interconnect path is disclosed. First, a first identification is sent from a first port of a first node. Then, the first identification is received at a first port of a second node. The interconnect path is the between the first port of the first node and the first port of the second node.

Other aspects and advantages of the present invention will become apparent from the following detailed description, taken in combination with the accompanying drawings, illustrating by way of example the principles of the invention.

DETAILED DESCRIPTION

Figure 1:
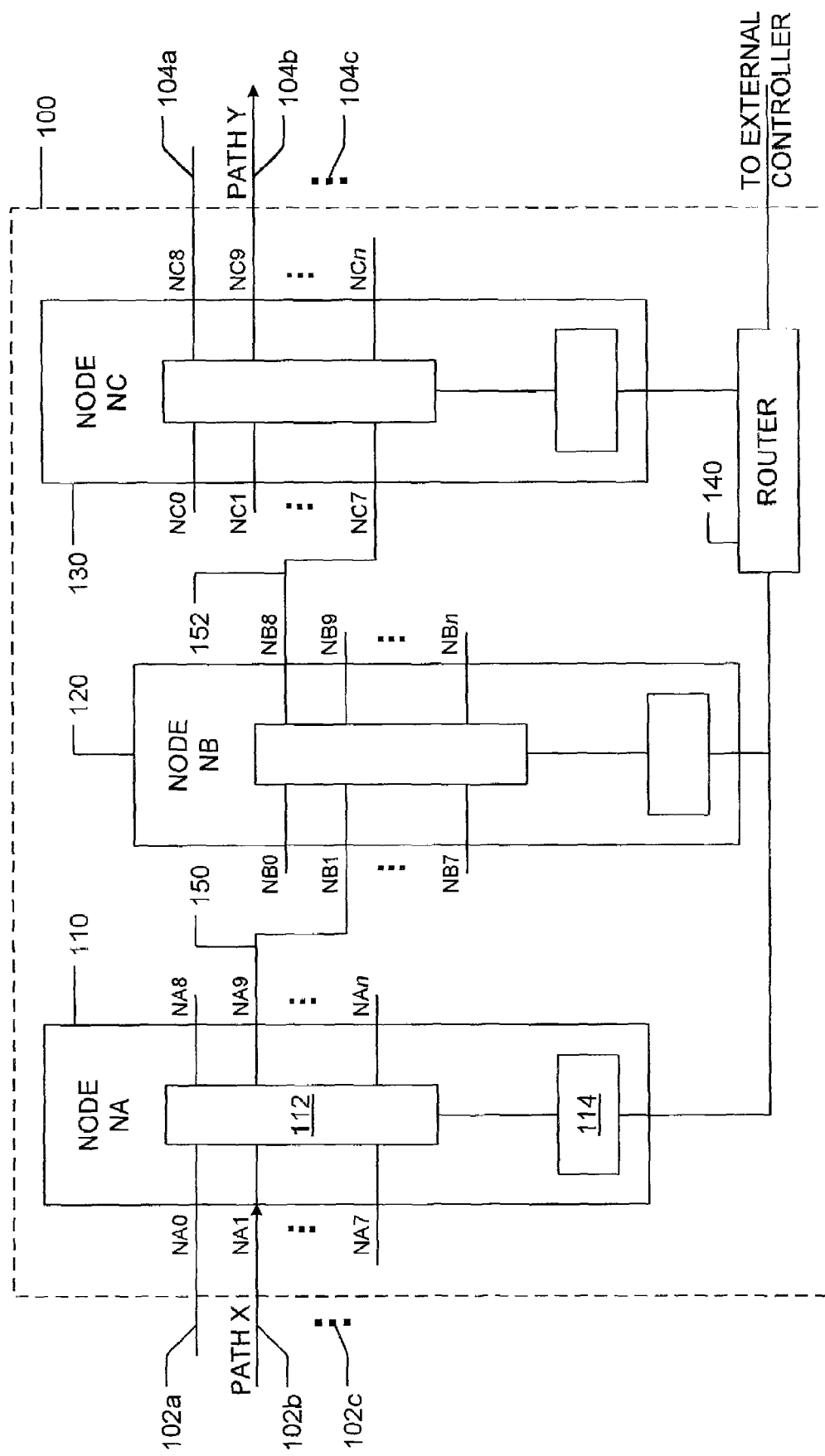
FIG. 1 is a simplified illustration of an optical network including prior art optical nodes.

As shown in the drawings for purposes of illustration, the present invention is embodied in an optical node apparatus having an optical switch for routing optical signals, the optical switch including ports. The apparatus also includes a light source, a light detector, and a control circuit connected to the optical switch. The optical node sends its node identification via each of its ports, and also listens to each of its ports to detect node id's from other optical nodes connected to the optical node.

Figure 2:
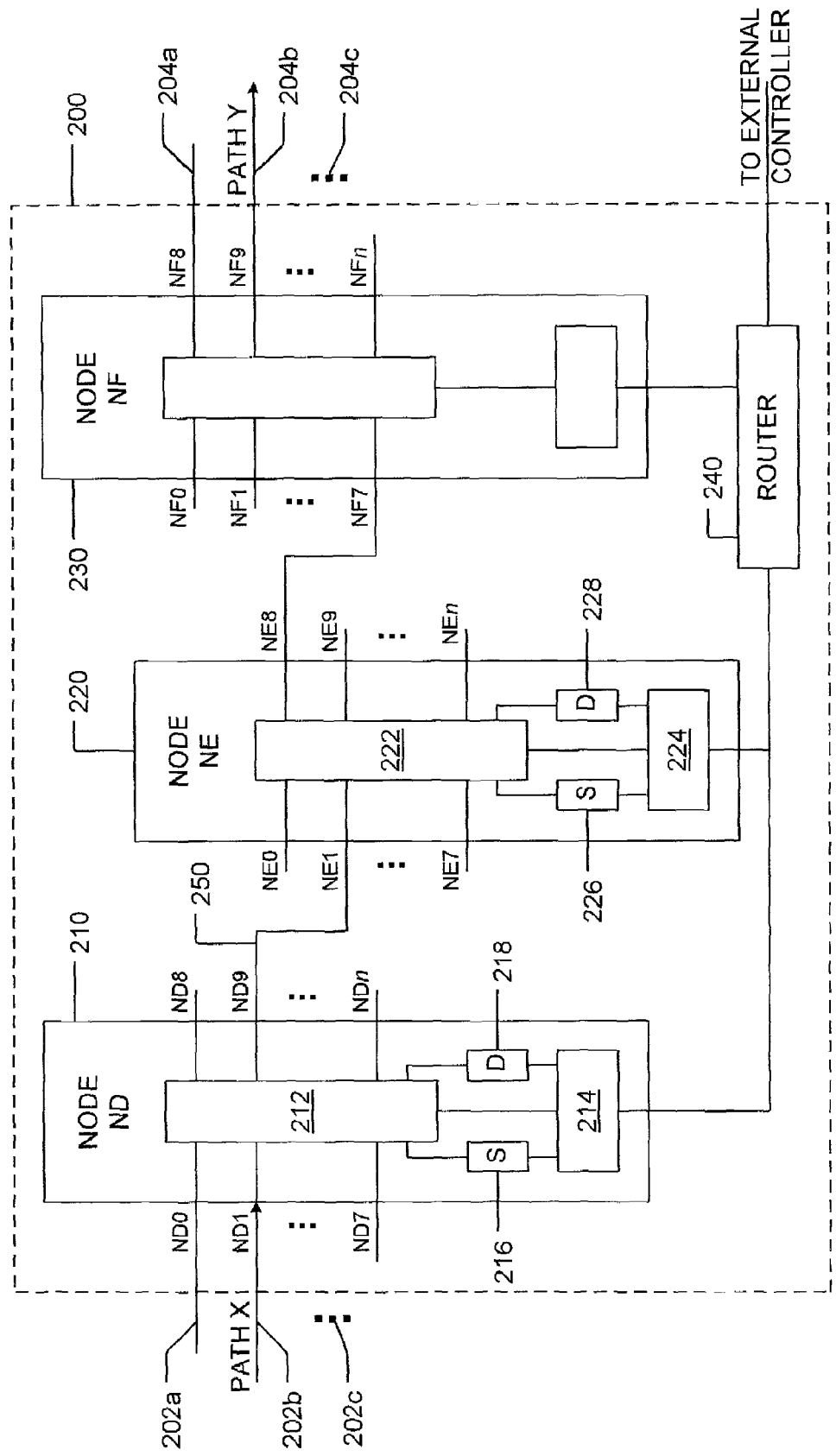
FIG. 2 is a simplified illustration of an optical network according to one embodiment of the present invention.

Referring to FIG. 2, an optical network 200 includes a plurality of optical nodes. For brevity, only three nodes are shown in FIG. 2. They are, node ND 210, node NE 220, and node NF 230. The network 200 includes a plurality of input lines represented by lines 202a, 202b, and ellipsis 202c (collectively, "202") and a plurality of output lines represented by lines 204a, 204b, and ellipsis 204c (collectively, "204"). Although only three nodes are shown, the switching network 200 may include hundreds or even thousands of interconnected optical nodes.

Node ND 210 has an optical switch 212, a control circuit 214, and a plurality of input lines and output lines, or ports, designated, for convenience, ND0 to NDn where n is an integer. Typical values for n may be 15, 63, or 255. For brevity, the ports of node ND 210 are referred to, collectively, as ports 211. For the illustrated embodiment, the ports 211 are ports of node ND 210 as well as ports of the switch 212. The switch 212 may utilize micro mirrors, liquid, or gaseous elements (collectively, "switching element") to direct or reflect optical signals from a first port to a second port.

A light source 216 is connected to one of the ports 211 of the switch 212. The light source 216 may be modulated to produce a light signal, which may be routed to any of the ports of the switch 212. A light detector 218 is connected to another port of the switch 212. The light detector 218 may be connected to any of the ports 211 of the switch 212 to detect light signal on the connected port. In the current technology, light sources may be implemented using or laser diodes. The light detectors may be implemented as photodiodes or phototransistors for example. Semiconductor light sources and detectors are well known in the industry and can be easily obtained from various manufacturers, for example, Agilent Technologies, Inc.

The control circuit 214, connected to the switch 212, controls the state of the switching elements to implement routing of the optical signals from a first port to a second port. For instance, the control circuit 214 may cause the switch 212 to connect port ND1 to port ND9 to route an incoming optical signal from line 202b, connected to port ND1, to be routed to port ND9 for forwarding to port NE1 of node NE 220.

The control circuit 214 may include a node id (for example, "ND") for node ND 210. Preferably, the node id uniquely identifies node ND 210 within the network 200. The control circuit 214 is also connected to the light source 216 and the light detector 218. Alternatively, the node id may be supplied by the path router as needed. The node id may further include a port identification portion that identifies the port (of the node) through which the communication is taking place.

Node NE 220 is similarly configured to node ND 210 and has switch 222, ports NE0 through NEN (collectively, ports 221), light source 226, light detector 228, and control circuit 224. The control circuit 224 is connected to the switch 222, the light source 226, and the light detector 228, and has a node id (for example, "NE") for node NE 220.

The technique of determining the topology, or the connection information, of network 200 can be explained using nodes NE 220 and ND 210. Control circuit 224 causes light detector 226 to produce optical signals ("identification signal") identifying node NE 220 such as signal corresponding to node id "NE". The identification signal may be sent to each of the ports 221 by routing, using switch 222, the identification signal to each of the ports 221. Preferably, the identification signal also includes information regarding which port of node NE 220 the identification signal is being sent from.

The identification signal is received by node ND 210. Control circuit 214 of node ND 210 causes light detector 218 to receive optical signals from each of ports 211 of node ND 210. When light detector 218 is connected to port ND9, light detector 218 receives the identification signal from port NE1 of node NE 220. The received identification signal is forwarded to control circuit 214. With the received identification signal, control circuit 214 recognizes that its port ND9 is connected to port NE1 of node NE 220 and stores this connection information, forwards the connection information to a path router 240 to update the path router 240, or both. The connection is illustrated by connection 250 in FIG. 2. Additionally, control circuit 214 may send the connection information to another node, not shown, such that the other node is informed about the connection 219.

Based on the available paths, the path router 240 can then make optical path connections as requested. The path router 240 may include the following components: (1) information on the physical path topology; (2) Switch configuration (number of ports, etc.); and (3) current list of requested optical path connections including dynamic requests to change optical paths. These requests need not know the physical topology of the network but rather specification of the endpoint to endpoint connection. The path router 240 maps the optical path connection requests to physical switch changes based upon the physical topology. The word "connection" includes, without limitation, relatively static port to port switch connections as well as the physical network topology, or how the switches are physically connected.

The process also works in reverse. That is, node ND 210 sends its node identification "ND" via its ports 211 as identification signal. When the identification signal is sent on port ND9, node NE 220 detects the identification signal, recognizes that its port NE1 is connected to port ND9 of node ND 210, and stores this connection information. The connection information is then reported to the path router 240.

Therefore, under the present invention, the topology of the network is dynamically determined using self-identifying nodes such as node ND 210 and node NE 220. In one embodiment of the present invention, all nodes of the network 200 are similarly configured to illustrated nodes ND 210 or NE 220. However, this is not required. In the network 200, node NF 230 does not include a light source or a light detector; however, its route topology may be manually entered into the path router. In the case that such node is connected to nodes with node identification capability, such topology may be found.

The connection information detection may be performed for unused ports. That is, for the ports for which no connection information exists. Alternatively, the connection information detection may be performed even for used ports using supervisory channels or bands.

The path router 240 may maintain the connection information in a routing table. Alternatively, the connection information may be maintained in a distributed manner by the nodes themselves.

From the foregoing, it will be appreciated that the present invention is novel and offers advantages over the current art. The present invention results in an automatic determination of connection information in an optical network, the connection information being less susceptible to errors. Although a specific embodiment of the invention is described and illustrated above, the invention is not to be limited to the specific forms or arrangements of parts so described and illustrated. For example, each optical node such as node ND 210 may include a plurality of light sources, a plurality of light detectors, or both. Alternatively, light source 216 may be built outside the node 210 with the identification signals being sent to the node via one of the ports. Likewise, light detector 218 may be located outside the node 210 with the light signals being sent out to the external light detector for processing. The invention is limited only by the claims that follow.

What is claimed is:

1. An optical network comprising:
   a plurality of nodes where each node comprises:
   an optical switch including a plurality of ports, each port adapted to transmit optical signals and to received optical signals, and each port assigned a port identification unique to each port;
   said optical switch operable to route optical signal from a first port to a second port;
   a light source connected to said optical switch, said light source operable to generate optical signals;
   a light detector connected to said optical switch, said light source operable to detect optical signals;
   a control circuit connected to said optical switch, said light source, and said light detector;
   said control circuit operable to determine connection information for each of the ports of said optical switch, the connection information including port identification and node identification of ports and nodes connected to each of said optical switch; and
   a router connected to each node of said plurality of nodes adapted to receive the connection information from the nodes of said plurality of nodes.

2. An optical network recited in claim 1 wherein said router is programmed to poll said control circuit of each node for connection information.

3. An optical network recited in claim 1 wherein a first control circuit of a first node is operable to forward its connection information to a second control circuit of a second node.

4. An optical network recited in claim 1 wherein a first control circuit of a first node activates a first light source of the first node to generate node identification signal for transmission to a second node via one of the ports of the first node.

5. A method of determining topology of a network having a plurality of interconnected nodes, each node having a plurality of ports, and wherein a first port of a first node is connected to a first port of a second node, and a second port of the second node is connected to a first port of a third node, the method comprising:
   transmitting a node identification signal from the first port of the second node wherein the node identification signal includes node identification of the second node and port identification of the first port of the second node;
   receiving, at the first port of the first node, the transmitted node identification signal;
   determining connection information, from the received node identification signal, that the first port of the first node is connected to the first port of the second node;
   storing the connection information;
   forwarding the connection information to a router;
   transmitting a node identification signal from the second port to the second node wherein the node identification signal includes node identification of the second node and port identification of the second port of the second node;
   receiving, at the first port of the third node, the transmitted node identification signal;
   determining connection information, from the received node identification signal, that the first port of the third node is connected to the second port of the second node;
   storing the connection information; and
   forwarding the connection information to a router.

6. The method recited in claim 5 wherein the first node is identified using a first node identification provided by the router.

7. The method recited in claim 5 further comprising a step of storing, at the router, the connection information.

8. The method recited in claim 5 further comprising a step of polling the first node for the connection information.

* * * * *